US012675845B2

(12) United States Patent
Lin et al.

(10) Patent No.: US 12,675,845 B2
(45) Date of Patent: Jul. 7, 2026

(54) IMAGE PROCESSING CIRCUIT WITH INDEPENDENT CLOCK FREQUENCY AND ASYNCHRONOUS DESIGN AND ASSOCIATED IMAGE PROCESSING METHOD

(71) Applicant: Realtek Semiconductor Corp., HsinChu (TW)

(72) Inventors: Tien-Hung Lin, HsinChu (TW); Chia-Wei Yu, HsinChu (TW); Yi-Ting Bao, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 343 days.

(21) Appl. No.: 18/215,806

(22) Filed: Jun. 28, 2023

(65) Prior Publication Data

US 2024/0144428 A1     May 2, 2024

(30) Foreign Application Priority Data

Oct. 27, 2022    (TW) .................................. 111140867

(51) Int. Cl.
*G06T 3/4053* (2024.01)
*G06T 3/4046* (2024.01)
(52) U.S. Cl.
CPC .......... *G06T 3/4053* (2013.01); *G06T 3/4046* (2013.01)
(58) Field of Classification Search
None
See application file for complete search history.

(56) References Cited

U.S. PATENT DOCUMENTS

2018/0199250 A1* 7/2018 Vare ......................... H04W 8/24
2020/0394772 A1* 12/2020 Afra ......................... G06F 17/11

FOREIGN PATENT DOCUMENTS

JP      2000138777 A  * 5/2000 ............... G06T 1/20
TW      200719714      5/2007

OTHER PUBLICATIONS

Ranganathan N, Vijaykrishnan N, Bhavanishankar N. A linear array processor with dynamic frequency clocking for image processing applications. IEEE Transactions on Circuits and Systems for Video Technology. Aug. 6, 2002;8(4):435-45. (Year: 2002).*

* cited by examiner

*Primary Examiner* — Vincent Rudolph
*Assistant Examiner* — Meredith Taylor
(74) *Attorney, Agent, or Firm* — Winston Hsu

(57) ABSTRACT

An image processing circuit includes a receiving circuit, a transmitting circuit, a first asynchronous handshake circuit, a super resolution scale-up model and a second asynchronous handshake circuit. The receiving circuit is arranged to receive an input image with a first pixel clock frequency. The first asynchronous handshake circuit is arranged to receive the input image from the receiving circuit according to a receiving timing. The super resolution scale-up model is arranged to scale up the input image to generate an output image with a second pixel clock frequency. The second asynchronous handshake circuit is arranged to output the output image to the transmitting circuit according to a transmitting timing to transmit the output image, wherein the first asynchronous handshake circuit, the super resolution scale-up model, and the second asynchronous handshake circuit operate at a clock frequency independent of the first pixel clock frequency and the second pixel clock frequency.

7 Claims, 4 Drawing Sheets

IMAGE PROCESSING CIRCUIT WITH INDEPENDENT CLOCK FREQUENCY AND ASYNCHRONOUS DESIGN AND ASSOCIATED IMAGE PROCESSING METHOD

BACKGROUND OF THE INVENTION

1. Field of the Invention

The present invention is related to image processing, and more particularly, to a super resolution (SR) scale-up circuit with an independent clock frequency and an asynchronous design.

2. Description of the Prior Art

For conventional scale-up technology based on deep learning, a conventional SR scale-up model architecture is usually a convolutional neural network (CNN). A model complexity of the SR scale-up model varies with a convolutional operation count of the SR scale-up model for each pixel of multiple pixels of an input image. When an input image of the SR scale-up model is scaled up to generate an output image, an input throughput of the SR scale-up model should be equal to an output throughput of the SR scale-up model. Since the model complexity, a size of the input image, and a size of the output image may all vary, an additional dummy cycle must be adjusted in order to maintain an equal relationship between the input throughput and the output throughput. Adjustment of the dummy cycle is required to be quite precise, however, and an additional control circuit may be required to control the dummy cycle, which may increase hardware costs. In addition, hardware design flexibility may be limited to avoid redundant dummy cycles. As a result, a novel SR scale-up circuit that can save implementation of circuits related to the dummy cycle is urgently needed.

SUMMARY OF THE INVENTION

It is therefore one of the objectives of the present invention to provide an SR scale-up circuit with an independent clock frequency and an asynchronous design that can save implementation of circuits related to the dummy cycle, to address the above-mentioned issues.

According to an embodiment of the present invention, an image processing circuit is provided. The image processing circuit comprises a receiving circuit, a transmitting circuit, a first asynchronous handshake circuit, an SR scale-up model, and a second asynchronous handshake circuit. The receiving circuit has a receiving timing, and is arranged to receive an input image, wherein the input image has a first pixel clock frequency. The transmitting circuit has a transmitting timing, and is arranged to transmit an output image, wherein the output image has a second pixel clock frequency. The first asynchronous handshake circuit is coupled to the receiving circuit, and is arranged to receive the input image from the receiving circuit according to the receiving timing. The SR scale-up model is coupled to the first asynchronous handshake circuit, and is arranged to scale up the input image to generate the output image. The second asynchronous handshake circuit is coupled to the SR scale-up model, and is arranged to dynamically output the output image to the transmitting circuit according to the transmitting timing. The first asynchronous handshake circuit, the SR scale-up model, and the second asynchronous handshake circuit operate at a clock frequency independent of the first pixel clock frequency and the second pixel clock frequency.

According to an embodiment of the present invention, an image processing method is provided. The image processing method comprises: receiving an input image by a receiving circuit, wherein the receiving circuit has a receiving timing, and the input image has a first pixel clock frequency; receiving the input image from the receiving circuit according to the receiving timing; scaling up the input image to generate an output image, wherein the output image has a second pixel clock frequency; dynamically outputting the output image to a transmitting circuit according to a transmitting timing of the transmitting circuit; and transmitting the output image by the transmitting circuit; wherein the steps of receiving the input image from the receiving circuit according to the receiving timing, scaling up the input image to generate the output image, and dynamically outputting the output image to the transmitting circuit according to the transmitting timing of the transmitting circuit all operate at a clock frequency independent of the first pixel clock frequency and the second pixel clock frequency.

One of the benefits of the SR scale-up circuit with an independent clock frequency and an asynchronous design is that, when there are different magnifications between an input image and an output image or the SR scale-up model has different model complexities, the independent clock frequency can be adjusted and controlled by a clock frequency control circuit to satisfy limitations between an input throughput and an output throughput without requiring an additional control circuit for controlling a dummy cycle. This can save hardware costs. In addition, for the SR scale-up model with different model complexities, only an operating frequency of the SR scale-up model needs to be considered, without considering a pixel clock frequency of the output image, which can improve design flexibility.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
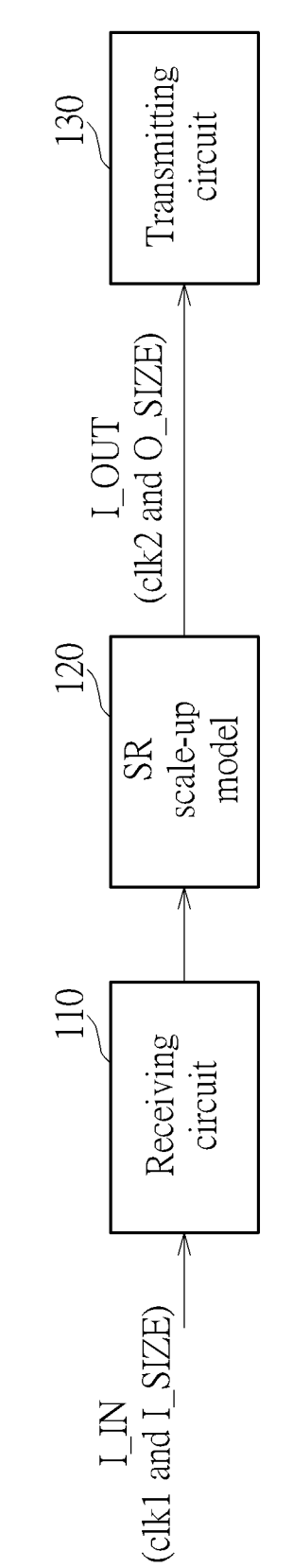
FIG. 1 is a diagram illustrating an image processing circuit.

FIG. 1 is a diagram illustrating an image processing circuit 100. As shown in FIG. 1, the image processing circuit 100 may include a receiving circuit 110, a super resolution (SR) scale-up model 120, and a transmitting circuit 130. The receiving circuit 110 may be arranged to receive an input image I_IN with a pixel clock frequency clk1. The SR scale-up model 120 may be arranged to receive the input image I_IN from the receiving circuit 110, and scale up the input image I_IN to generate an output image I_OUT with a pixel clock frequency clk2, wherein architecture of the SR scale-up model 120 may be a convolutional neural network (CNN), and a frame rate (e.g. 60 Hz) of the input image I_IN is the same as that of the output image I_OUT. It should be noted that the SR scale-up model 120 may have different model complexities, wherein the model complexity is related to a convolutional operation count of the SR scale-up model 120 for each pixel of multiple pixels of the input image I_IN. For example, when the SR scale-up model 120 is required to perform one convolution operation upon each of the pixels of the input image I_IN, the model complexity of the SR scale-up model 120 may be set as 1; and when the SR scale-up model 120 is required to perform four convolution operations upon each of the pixels of the input image I_IN, the model complexity of the SR scale-up model 120 may be set as 4. In addition, an operating frequency of the SR scale-up model 120 may be set as the pixel clock frequency clk1 or the pixel clock frequency clk2. In this embodiment, the operating frequency of the SR scale-up model 120 is set as the pixel clock frequency clk2.

In order to avoid overflow or underflow, an input throughput and an output throughput of the SR scale-up model 120 must satisfy the following equation:

$$(\text{model\_complexity}+\text{dummy\_cycle})\\ *I\_SIZE*T\_clk2=O\_SIZE*T\_clk2$$

wherein the left side and the right side of the above equation are the input throughput and the output throughput, respectively, model complexity is the model complexity of the SR scale-up model 120, dummy_cycle is a dummy cycle arranged to maintain an equal relationship between the input throughput and the output throughput, I_SIZE is a size of the input image I_IN, T_clk2 is a period corresponding to the pixel clock frequency clk2, and O_SIZE is a size of the output image I_OUT.

Assume that the size of the input image I_IN may be 2160p (4K*2K), 1080p (2K*1K), or 720p. Under a condition that the size of the input image I_IN is 2160p, the pixel clock frequency clk1 of the input image I_IN may be 594 MHz (4400*2250*60=594 MHz). Under a condition that the size of the input image I_IN is 1080p, the pixel clock frequency clk1 of the input image I_IN may be 148.5 MHz. Under a condition that the size of the input image I_IN is 720p, the pixel clock frequency clk1 of the input image I_IN may be 74.25 MHz. In addition, assume that the SR scale-up model 120 may be a first SR scale-up model Model_A or a second SR scale-up model Model_B, wherein a model complexity of the first SR scale-up model Model_A is set as 4, and a model complexity of the second SR scale-up model Model_B is set as 1.

When the size of the input image I_IN is 2160p and the SR scale-up model 120 is the first SR scale-up model Model_A, the operating frequency of the SR scale-up model 120 is required to be 2376 (594*4) MHz. When the size of the input image I_IN is 1080p and the SR scale-up model 120 is the first SR scale-up model Model_A, the operating frequency of the SR scale-up model 120 is required to be 594 (148.5*4) MHz. When the size of the input image I_IN is 720p and the SR scale-up model 120 is the first SR scale-up model Model_A, the operating frequency of the SR scale-up model 120 is required to be 297 (74.25*4) MHz. When the size of the input image I_IN is 2160p and the SR scale-up model 120 is the second SR scale-up model Model_B, the operating frequency of the SR scale-up model 120 is required to be 594 (594*1) MHz. When the size of the input image I_IN is 1080p and the SR scale-up model 120 is the second SR scale-up model Model_B, the operating frequency of the SR scale-up model 120 is required to be 148.5 (148.5*1) MHz. When the size of the input image I_IN is 720p and the SR scale-up model 120 is the second SR scale-up model Model_B, the operating frequency of the SR scale-up model 120 is required to be 74.25 (74.25*1) MHz.

In addition, assume that the size of the output image I_OUT is 2160p and the pixel clock frequency clk2 of the output image I_OUT is 594 MHz (4400*2250*60=594 MHz). Since the operating frequency of the SR scale-up model 120 is set as the pixel clock frequency clk2 (=594 MHz), the configuration of the size of the input image I_IN being 2160p and the SR scale-up model 120 being the first SR scale-up model Model_A cannot be implemented.

Figure 2:
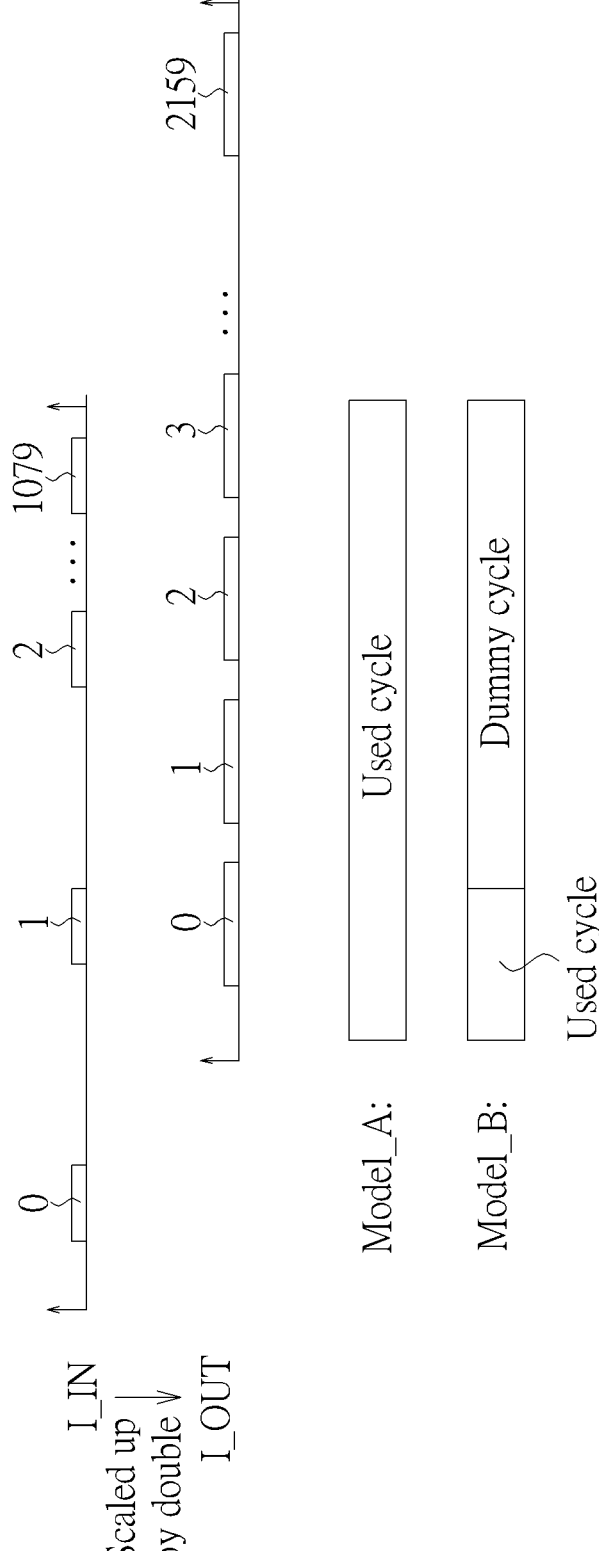
FIG. 2 is a diagram illustrating two SR scale-up models with different model complexities being utilized to perform an image magnification by the image processing circuit shown in FIG. 1.

Refer to FIG. 2, which is a diagram illustrating two SR scale-up models with different model complexities (i.e. the first SR scale-up model Model_A and the second SR scale-up model Model_B) being utilized to perform an image magnification by the image processing circuit 100 shown in FIG. 1. In FIG. 2, the size of the input image I_IN and the pixel clock frequency are 1080p and 148.5 MHz, respectively, and the size of the output image I_OUT and the pixel clock frequency are 2160p and 594 MHz, respectively (i.e. the SR scale-up model 120 scales up the input image I_IN by double). As shown in FIG. 2, for the first SR scale-up model Model_A, the image processing circuit 100 can satisfy throughput requirement (i.e. 4\*(2K\*1K)\*T_clk2= (4K\*2K)\*T_clk2) without an additional control circuit for controlling a dummy cycle. For the second SR scale-up model Model_B, the image processing circuit 100 requires an additional control circuit to control the dummy cycle for satisfying the throughput requirement. For example, the dummy cycle can be controlled as 3 to satisfy the throughput requirement (i.e. (1+3)\*(2K\*1K)\*T_clk2=(4K\*2K) \*T_clk2). The model complexity, the size of the input image I_IN and/or the size of the output image I_OUT may all vary, however, and the adjustment of the dummy cycle should be quite precise to maintain the equal relationship between the input throughput and the output throughput, which increases difficulty of software setting and hardware design. For example, when the size of the input image I_IN and the pixel clock frequency clk1 are 720p and 297 MHz, respectively, and the size of the output image I_OUT and the pixel clock frequency clk2 are 2160p and 594 MHz, respectively, the dummy cycle is required to be controlled to be other values than 3 to satisfy the throughput requirement. In addition, if only an SR scale-up model that can satisfy the throughput requirement without an additional control circuit is utilized in hardware design for avoiding redundant dummy cycles, the design flexibility will be limited.

Figure 3:
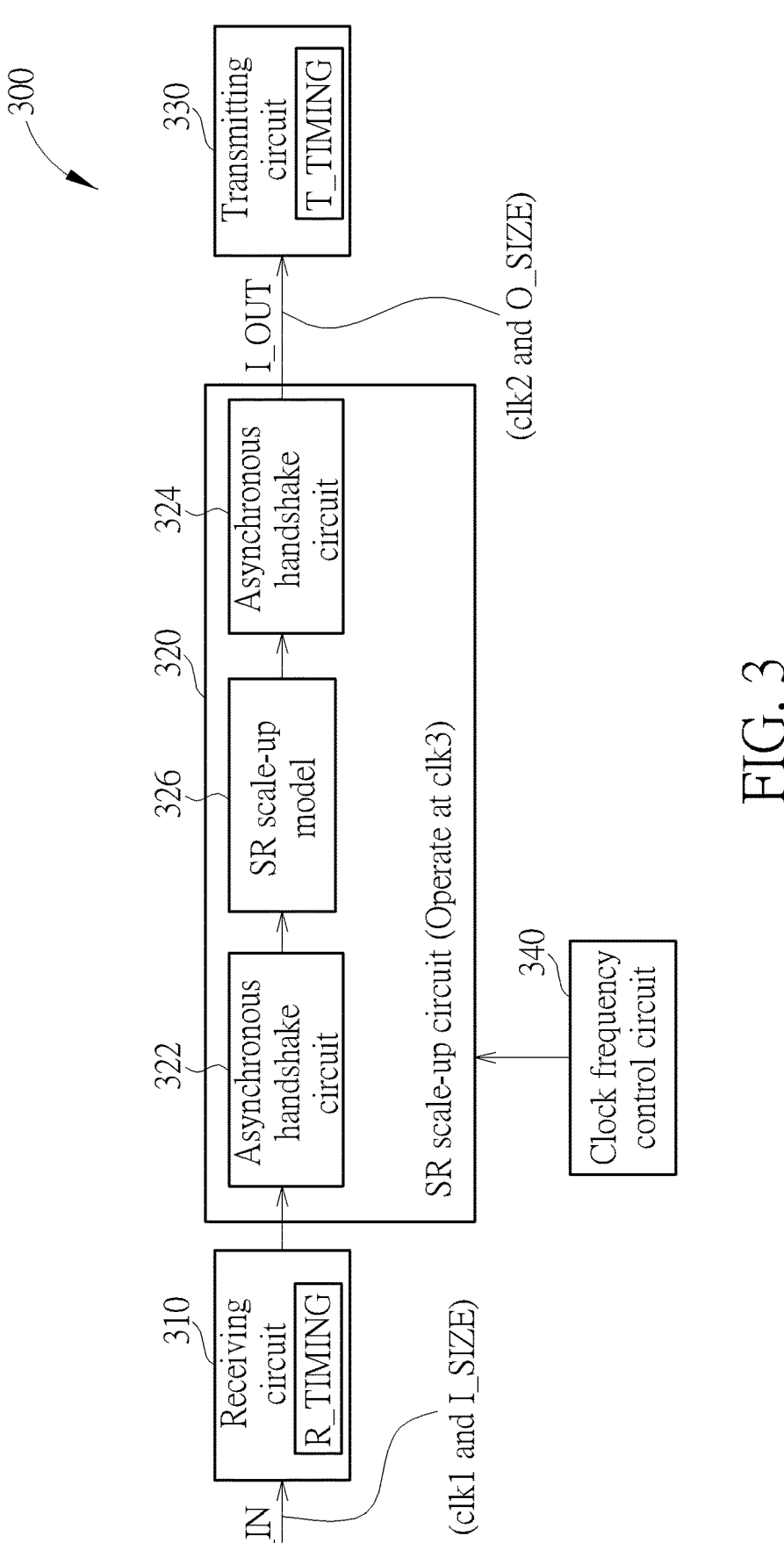
FIG. 3 is a diagram illustrating an image processing circuit with an independent clock frequency and an asynchronous design according to an embodiment of the present invention.

To address the above-mentioned issues, the present invention provides an SR scale-up circuit with an independent clock frequency and an asynchronous design. Refer to FIG. 3, which is a diagram illustrating an image processing circuit 300 with an independent clock frequency and an asynchronous design according to an embodiment of the present invention. As shown in FIG. 3, the image processing circuit 300 may include a receiving circuit 310, an SR scale-up circuit 320, and a transmitting circuit 330. The receiving circuit 310 has a receiving timing R_TIMING, and is arranged to receive an input image I_IN, wherein the input image I_IN has a pixel clock frequency clk1. The transmitting circuit 330 has a transmitting timing T TIMING, and is arranged to transmit an output image I_OUT, wherein the output image I_OUT has a pixel clock frequency clk2, and a frame rate (e.g. 60 Hz) of the input image I_IN is the same as that of the output image I_OUT. The SR scale-up circuit 320 may include multiple asynchronous handshake circuits 322 and 324 and an SR scale-up model 326. The asynchronous handshake circuit 322 may be coupled to the receiving circuit 310, and may be arranged to receive the input image I_IN from the receiving circuit 310 according to the receiving timing R_TIMING. The SR scale-up model 326 may be coupled to the asynchronous handshake circuit 322, and may be arranged to scale up the input image I_IN received by the asynchronous handshake circuit 322 to generate the output image I_OUT, wherein architecture of the SR scale-up model 326 may be the convolutional neural network (CNN). The asynchronous handshake circuit 324 may be coupled to the SR scale-up model 326, and may be arranged to dynamically output the output image I_OUT generated by the SR scale-up model 326 to the transmitting circuit 330 according to the transmitting timing T TIMING.

It should be noted that the SR scale-up circuit 320 (i.e. the asynchronous handshake circuits 322 and 324 and the SR scale-up model 326) operates at a clock frequency clk2 independent of the pixel clock frequency clk1 and the pixel clock frequency clk2. For example, the image processing circuit 300 may further include a clock frequency control circuit 340 (e.g. a phase-locked loop (PLL) circuit). The clock frequency control circuit 340 may be coupled to the SR scale-up circuit 320, and may be arranged to adjust and control the clock frequency clk3. In this way, the equation that should be satisfied for the input throughput and the output throughput of the SR scale-up model 326 can be modified as follows:

$$\text{model\_complexity}*I\_SIZE*T\_clk3=O\_SIZE*T\_clk2$$

wherein the left side and the right side of the above equation are input throughput and output throughput, respectively, model complexity is a model complexity of the SR scale-up model 326, I_SIZE is a size of the input image I_IN, T_clk3 is a period corresponding to the clock frequency clk3, T_clk2 is a period corresponding to the pixel clock frequency clk2, and O_SIZE is a size of the output image I_OUT. Since the image processing circuit 300 can maintain the equal relationship between the input throughput and the output throughput by adjusting and controlling the clock frequency clk3, an additional control circuit is not required to control the dummy cycle, which can save hardware costs and improve application compatibility of the image processing circuit 300.

When the transmitting circuit 330 is not required to transmit the output image I_OUT, the asynchronous handshake circuit 324 can temporarily stop operations of the SR scale-up model 326. No matter whether the operations of the SR scale-up model 326 are temporarily stopped or not, the asynchronous handshake circuit 322 can receive the input image I_IN from the receiving circuit 310 according to the receiving timing R_TIMING. Due to the asynchronous design, the equation that should be satisfied for the input throughput and the output throughput of the SR scale-up model 326 can be further modified as follows:

$$\text{model\_complexity}*I\_SIZE*T\_clk3 \geq O\_SIZE*T\_clk2$$

wherein under a condition that the input throughput is larger than or equal to the output throughput, the SR scale-up model 326 can operate normally without suffering from overflow or underflow.

It should be noted that, for the SR scale-up circuit 320 with the independent clock frequency (i.e. the clock frequency clk3) and the asynchronous design, an operating frequency of the SR scale-up model 326 is required to be not smaller than (i.e. larger than or equal to) a multiplication result of the pixel clock frequency clk1 and the model complexity of the SR scale-up model 326. Assume that the maximum operating frequency that can be supported by the SR scale-up model 326, the size of the output image I_OUT, and the pixel clock frequency clk2 are 2376 MHz, 2160p, and 564 MHz, respectively, and the SR scale-up model 326 may be a first SR scale-up model Model_A or a second SR scale-up model Model_B, wherein a model complexity of the first SR scale-up model Model_A is set as 4, and a model complexity of the second SR scale-up model Model_B is set as 1. Under a configuration of the input image I_IN with the size being 2160p and the pixel clock frequency clk1 being 594 MHz and the first SR scale-up model Model_A with the model complexity being 4, the operating frequency of the SR scale-up model 326 is required to be not smaller than 2376 MHz (594*4). Under a configuration of the input image I_IN with the size being 1080p and the pixel clock frequency clk1 being 148.5 MHz and the first SR scale-up model Model_A with the model complexity being 4, the operating frequency of the SR scale-up model 326 is required to be not smaller than 594 MHz (148.5*4). Under a configuration of the input image I_IN with the size being 720p and the pixel clock frequency clk1 being 74.25 MHz and the first SR scale-up model Model_A with the model complexity being 4, the operating frequency of the SR scale-up model 326 is required to be not smaller than 297 MHz (74.25*4).

In another example, under a configuration of the input image I_IN with the size being 2160p and the pixel clock frequency clk1 being 594 MHz and the second SR scale-up model Model_B with the model complexity being 1, the operating frequency of the SR scale-up model 326 is required to be not smaller than 594 MHz (594*1). Under a configuration of the input image I_IN with the size being 1080p and the pixel clock frequency clk1 being 148.5 MHz and the second SR scale-up model Model_B with the model complexity being 1, the operating frequency of the SR scale-up model 326 is required to be not smaller than 148.5 MHz (148.5*1). Under a configuration of the input image I_IN with the size being 720p and the pixel clock frequency clk1 being 74.25 MHz and the second SR scale-up model Model_B with the model complexity being 1, the operating frequency of the SR scale-up model 326 is required to be not smaller than 74.25 MHz (74.25*1).

Figure 4:
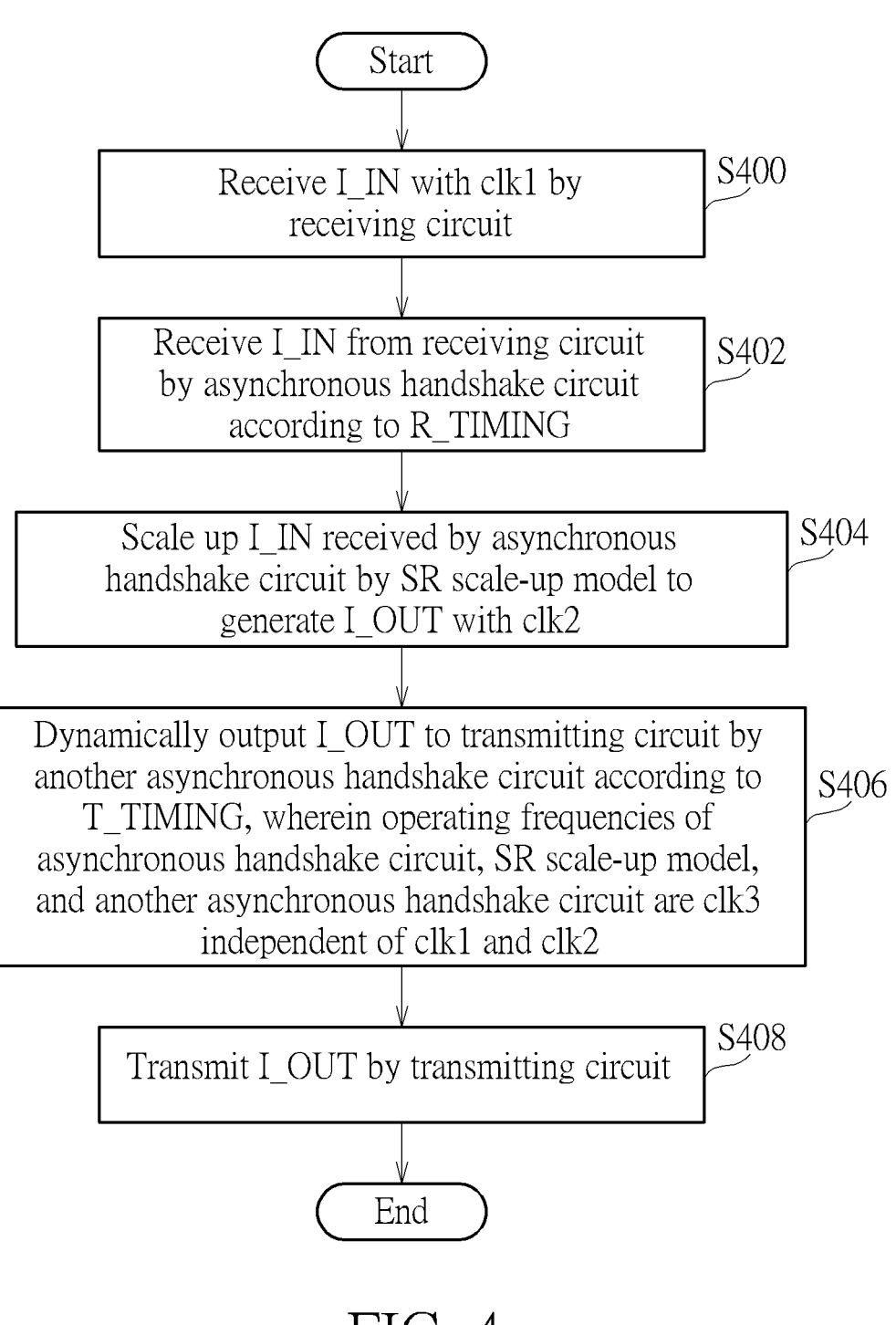
FIG. 4 is a flow chart of an image processing method according to an embodiment of the present invention.

FIG. 4 is a flow chart of an image processing method according to an embodiment of the present invention. Provided that the result is substantially the same, the steps are not required to be executed in the exact order shown in FIG. 4. For example, the image processing method shown in FIG. 4 can be implemented by the image processing circuit 300 shown in FIG. 3.

In Step S400, the input image I_IN is received by the receiving circuit 310, wherein the receiving circuit 310 has the receiving timing R_TIMING, and the input image I_IN has the pixel clock frequency clk1.

In Step S402, the input image I_IN is received from the receiving circuit 310 by the asynchronous handshake circuit 322 according to the receiving timing R_TIMING. For example, no matter whether operations of the SR scale-up model 326 are temporarily stopped, the asynchronous handshake circuit 322 receives the input image I_IN from the receiving circuit 310 according to the receiving timing R_TIMING.

In Step S404, the input image I_IN received by the asynchronous handshake circuit 322 is scaled up by the SR scale-up model 326 to generate the output image I_OUT, wherein the output image I_OUT has the pixel clock frequency clk2.

In Step S406, the output image I_OUT generated by the SR scale-up model 326 is dynamically output to the transmitting circuit 330 by the asynchronous handshake circuit 324 according to the transmitting timing T TIMING. For example, when the transmitting circuit 330 is not required to transmit the output image I_OUT, the asynchronous handshake circuit 324 may temporarily stop the operations of the SR scale-up model 326. It should be noted that Steps S402, S404, and S406 operate at the clock frequency clk3 independent of the pixel clock frequencies clk1 and clk2 (i.e. the operating frequency of the SR scale-up circuit 320 including the asynchronous handshake circuits 322 and 324 and the SR scale-up model 326 is the clock frequency clk3).

In Step S408, the output image I_OUT is transmitted by the transmitting circuit 330.

Since a person skilled in the pertinent art can readily understand details of the steps shown in FIG. 4 after reading the above paragraphs, further description is omitted here for brevity.

In summary, via the SR scale-up circuit 320 with an independent clock frequency (i.e. the clock frequency clk3) and asynchronous design, when there are different magnifications between the input image I_IN and the output image I_OUT or the SR scale-up model 326 has different model complexities, the clock frequency clk3 can be adjusted and controlled by the clock frequency control circuit 340 to satisfy the limitation between the input throughput and the output throughput, without an additional control circuit for controlling a dummy cycle, meaning hardware costs can be saved. In addition, for the SR scale-up model 326 with different model complexities, only an operating frequency of the SR scale-up model 326 needs to be considered, without considering the pixel clock frequency clk2 of the output image I_OUT, so design flexibility can also be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
a receiving circuit, having a receiving timing, and arranged to receive an input image, wherein the input image has a first pixel clock frequency;
a transmitting circuit, having a transmitting timing, and arranged to transmit an output image, wherein the output image has a second pixel clock frequency;
a first asynchronous handshake circuit, coupled to the receiving circuit, and arranged to receive the input image from the receiving circuit according to the receiving timing;
a super resolution (SR) scale-up model, coupled to the first asynchronous handshake circuit, and arranged to scale up the input image to generate the output image; and
a second asynchronous handshake circuit, coupled to the SR scale-up model, and arranged to dynamically output the output image to the transmitting circuit according to the transmitting timing;
wherein the first asynchronous handshake circuit, the SR scale-up model, and the second asynchronous handshake circuit operate at a clock frequency independent of the first pixel clock frequency and the second pixel clock frequency;
wherein the image processing circuit further comprises:
a clock frequency control circuit, arranged to adjust the clock frequency to satisfy a limitation between an input throughput of the SR scale-up model and an output throughput of the SR scale-up model;
wherein the SR scale-up model is a convolutional neural network (CNN) architecture, and a model complexity of the SR scale-up model is related to a convolutional operation count of the SR scale-up model for each pixel of multiple pixels of the input image;
wherein the clock frequency is not smaller than a multiplication result of the first pixel clock frequency and the model complexity.

2. The image processing circuit of claim 1, wherein in response to the transmitting circuit not being required to transmit the output image, the second asynchronous handshake circuit temporarily stops operations of the SR scale-up model.

3. The image processing circuit of claim 2, wherein no matter whether the operations of the SR scale-up model are temporarily stopped or not, the first asynchronous handshake circuit receives the input image from the receiving circuit according to the receiving timing.

4. The image processing circuit of claim 1, wherein the input throughput of the SR scale-up model is a multiplication result of the model complexity, a size of the input image, and a period corresponding to the clock frequency; and the output throughput of the SR scale-up model is a multiplication result of a size of the output image and a period corresponding to the second pixel clock frequency.

5. The image processing circuit of claim 1, wherein the input throughput is equal to the output throughput by adjusting the clock frequency via the clock frequency control circuit.

6. The image processing circuit of claim 1, wherein the input throughput is larger than the output throughput by adjusting the clock frequency via the clock frequency control circuit.

7. An image processing method, comprising:
receiving an input image by a receiving circuit, wherein the receiving circuit has a receiving timing, and the input image has a first pixel clock frequency;
receiving the input image from the receiving circuit according to the receiving timing;
scaling up, by a super resolution (SR) scale-up model, the input image to generate an output image, wherein the output image has a second pixel clock frequency;
dynamically outputting the output image to a transmitting circuit according to a transmitting timing of the transmitting circuit; and
transmitting the output image by the transmitting circuit;
wherein the steps of receiving the input image from the receiving circuit according to the receiving timing, scaling up the input image to generate the output image, and dynamically outputting the output image to the transmitting circuit according to the transmitting timing of the transmitting circuit all operate at a clock frequency independent of the first pixel clock frequency and the second pixel clock frequency;
wherein the image processing method further comprises:
adjusting the clock frequency to satisfy a limitation between an input throughput of the SR scale-up model and an output throughput of the SR scale-up model;

wherein the SR scale-up model is a convolutional neural network (CNN) architecture, and a model complexity of the SR scale-up model is related to a convolutional operation count of the SR scale-up model for each pixel of multiple pixels of the input image;

wherein the clock frequency is not smaller than a multiplication result of the first pixel clock frequency and the model complexity.

\* \* \* \* \*